Feb. 2, 1960 W. F. SCHREIBER 2,923,819

CRYSTAL GATING CIRCUIT

Filed Feb. 28, 1955

INVENTOR
WILLIAM F. SCHREIBER
BY Theodore Jay Jr.
ATTORNEY

United States Patent Office 2,923,819
Patented Feb. 2, 1960

2,923,819

CRYSTAL GATING CIRCUIT

William F. Schreiber, North Hollywood, Calif., assignor, by mesne assignments, to Sylvania Electric Products Inc., Wilmington, Del., a corporation of Delaware Application February 28, 1955, Serial No. 491,035

10 Claims. (Cl. 250—27)

My invention relates to electronic switching and gating circuits.

In many types of electronic equipment and particularly in data handling apparatus and the like, it is necessary to transfer a first incoming electrical signal between first and second terminals at instants when a second incoming signal is supplied to a third terminal, or alternatively, to produce an output signal at the second terminal at instants when the first and second incoming signals are supplied to their corresponding terminals. Signal coincidence circuits are used for both purposes. Conventionally such circuits include a plurality of electric discharge tubes or semiconductors. Since both tubes and semiconductors are non-linear circuit elements and consequently introduce various kinds of frequency and amplitude distortion into the circuits in which they are used, any decrease in the number of these elements is highly desirable. Moreover, any such decrease will tend to simplify and reduce the cost of the associated circuits.

I have invented a signal coincidence circuit in which only one non-linear element is required, thus introducing a minimum of distortion into the circuit and providing for simplified and inexpensive circuit construction.

Accordingly it is an object of the present invention to provide a new and improved signal coincidence circuit of the character indicated.

Another object is to provide a new and improved signal coincidence circuit which incorporates one non-linear circuit element.

Still another object is to provide a new and improved signal coincidence circuit which incorporates one asymmetrically conductive circuit element such as a crystal diode.

These and other objects of my invention will either be explained or will become apparent to those skilled in the art when this specification is studied in conjunction with the accompanying drawings wherein.

Briefly stated, my invention contemplates a three terminal signal coincidence circuit. First and second incoming signals are supplied to corresponding first and second terminals. Each of these first and second terminals is connected through an isolation resistor to the third terminal, the values of these isolation resistors being sufficiently high to prevent appreciable signal interaction. An asymmetrically conductive element such as a crystal diode, which has an electrical characteristic at which the element presents a low resistance to current flow when a potential of selected polarity is applied thereacross and presents a high resistance to current flow when the polarity of the applied potential is reversed, is connected between the third terminal and a point of biasing potential.

The direction of the diode polarization and the value and polarity of the biasing potential is so chosen with respect to the polarity and magnitude of the two incoming signals, that when and only when both incoming signals are present at their corresponding terminal, the diode is rendered essentially non-conductive and an output signal is produced at the third terminal. In all other situations, the diode remains heavily conductive, the third terminal is clamped to the bias potential point, and no output signal is produced.

Figure 1:
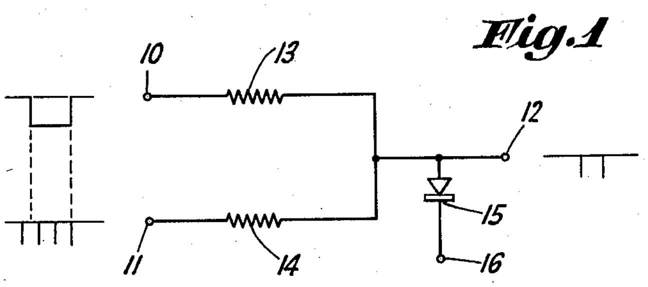
Fig. 1 is a diagram of one embodiment of a signal coincidence circuit in accordance with the invention.

Referring now to Fig. 1, there is provided a signal coincidence circuit with input terminal 10 connected through isolation resistor 13 to output terminal 12 and with input terminal 11 connected through isolation resistor 14 to output terminal 12. A crystal diode 15 is connected between terminal 12 and a point of negative biasing potential 16.

A first train of negative going pulses having a relatively large pulse width, for example, a pedestal signal in a television transmission system, is supplied to terminal 10. A second train of negative going pulses having a relatively small pulse width, for example, a video signal, is supplied to terminal 11. The diode 15 is polarized as indicated and the value of the negative bias applied at point 16 is sufficient to maintain the diode conductive except during the instants when pulses in both trains are simultaneously supplied to their corresponding terminals. At these instants, sufficient negative potential appears at the anode of the diode to render the diode non-conductive, and negative going pulses produced at these instants appear at output terminal 12.

As long as diode 15 conducts, terminal 12 is clamped to point 16 and no output signal can be produced.

If the polarity of the incoming pulse trains is reversed, it is necessary to reverse the diode polarization and to reverse the polarity of the bias applied to point 16; the circuit will then operate in the same manner as before.

Figure 2:
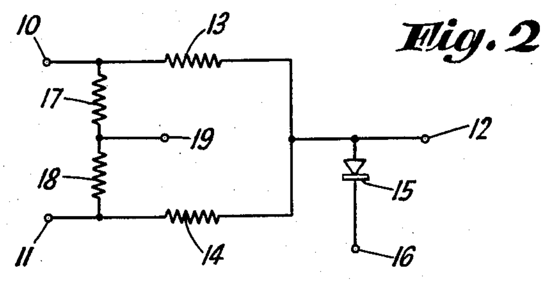
Fig. 2 is a diagram of a refinement of the circuit shown in Fig. 1.

For many circuit applications, resistors 13 and 14 provide sufficient signal isolation. For applications in which a very high degree of isolation is required, the circuit of Fig. 1 can be modified as shown in Fig. 2. The modification consists of the insertion of resistors 17 and 18 between corresponding terminals 10 and 11 and a second potential point 19. When for example, point 19 is grounded, and the values of resistors 17 and 18 are sufficiently high, the entire circuit presents a substantially unchanging impedance across both input terminals whether or not signals are present and the desired isolation is obtained. The circuit of Fig. 2 otherwise is identical to that of Fig. 1 and operates in the same fashion.

Figure 3:
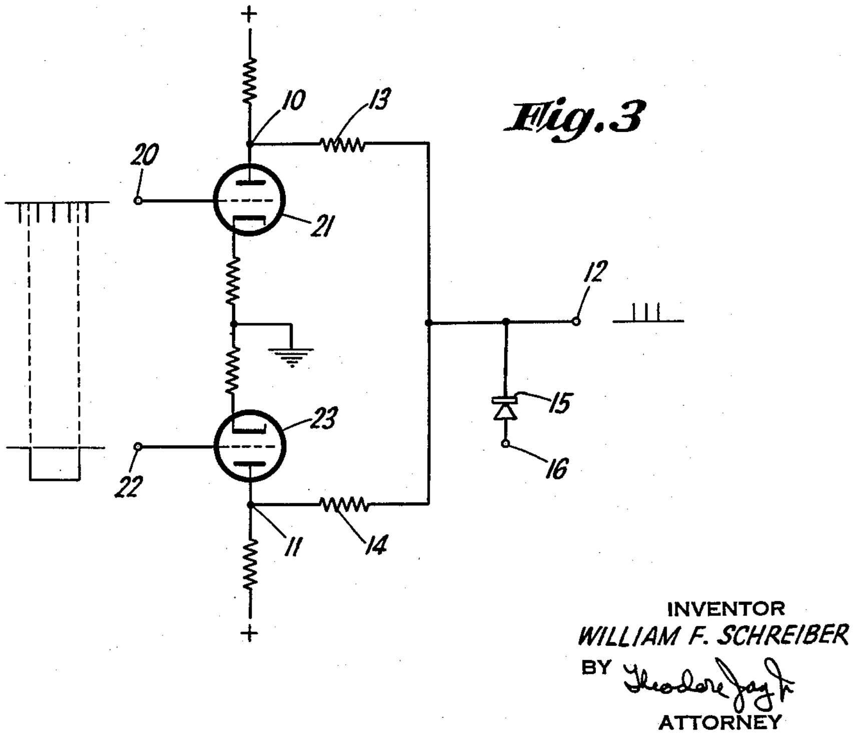
Fig. 3 is a diagram of a data handling device incorporating the circuit shown in Fig. 1.

Fig. 3 shows a typical data handling device which incorporates the circuit of Fig. 1. Terminals 10 and 11 of this circuit are connected to the anode circuits of triodes 21 and 23 respectively. Incoming negative going pulses of the character indicated are respectively supplied to the grid of the corresponding triode.

Diode 15 is connected between output terminal 12 and a point of positive bias 16 with the polarization indicated. Diode 15 is normally conductive and no output signal appears at terminal 12. However, when negative going pulses are supplied to the grids of both tubes simultaneously, amplified positive going pulses are supplied to terminals 10 and 11, diode 15 is rendered inoperative, and positive going output pulses appear at terminal 12.

While I have shown and pointed out and described my invention in the various preferred embodiments, it will be apparent to those skilled in the art that many other modifications can be made within the scope and sphere of my invention as defined in the claims which follow.

What is claimed is:

1. In combination, first, second and third electric terminals; first and second resistors respectively connecting the first and second terminals to said third terminal; and means including an asymmetrically conductive circuit element coupled between said third terminal and a point of biasing potential to electrically isolate said third terminal from said potential point when first and second signals of like polarity are simultaneously supplied to the first and second terminals respectively, said element electrically connecting said third terminal to said potential point at intervals when at least one signal is absent.

2. The combination as set forth in claim 1 further including third and fourth resistors respectively connecting the first and second terminals to a second point of biasing potential.

3. A coincidence circuit comprising first and second input terminals and an output terminal, said circuit being adapted to produce an output signal at said output terminal when first and second signals of like selected polarity are simultaneously supplied to corresponding first and second input terminals, said circuit further including first and second resistors and a diode, said first and second resistors respectively coupling the first and second input terminals to said output terminal, said crystal diode being connected between the output terminal and a point of biasing potential, the diode polarization and the magnitude and polarity of said bias potential having such relation to the polarity of the incoming signals that the diode electrically isolates the output terminal from the potential point when both incoming signals are simultaneously supplied to the corresponding input terminals and said output signal is produced, said diode otherwise clamping the output terminal to said potential point and preventing the appearance of the output signal.

4. The coincidence circuit as set forth in claim 3 wherein the first and second resistors have resistance values at which said first and second signals are substantially isolated electrically from each other.

5. The coincidence circuit as set forth in claim 4 further including third and fourth resistors respectively coupling said first and second input terminals to a second potential point, said third and fourth resistors having resistance values at which virtually complete electrical isolation between the first and second incoming signals is obtained.

6. In combination, first, second and third terminals; means to supply first and second incoming signals of like selected polarity to the first and second terminals respectively; first and second resistors respectively coupling said first and second terminals to said third terminal, the resistance values being sufficiently high to provide a high degree of electrical isolation between said first and second signals; and a semiconductor diode connected between said third terminal and a point of operating potential, said diode being polarized in a direction at which a very high resistance path is established between the third terminal and the potential point at instants when both incoming signals are supplied simultaneously at their corresponding first and second terminals whereby an output signal is produced at the third terminal and a very low resistance path is established between the third terminal and the potential point at all other instants.

7. The combination as set forth in claim 6 further including third and fourth resistors respectively connecting the first and second terminals to a second point of operating potential and having resistance values at which additional incoming signal isolation is provided.

8. The combination as set forth in claim 6 wherein said signal supply means includes first and second electric discharge tubes, the output circuits of said first and second tubes being coupled to the first and second resistors respectively.

9. A signal coincidence circuit responsive to first and second pulse trains, said trains carrying pulses of like polarity, said circuit comprising a first resistor coupled between a first and a third terminal, said first train being applied to said first terminal; a second resistor coupled between a second and said third terminal, said second train being applied to said second terminal; and a normally conductive diode coupled between said third terminal and a point of biasing potential, said diode being rendered non-conductive only at instants when pulses in said first and second trains arrive at the corresponding first and second terminals in time coincidence, whereby an output pulse identifying said coincidence appears at said third terminal.

10. In a signal coincidence circuit provided with first, second and third terminals and responsive to first and second pulse trains which are respectively supplied to said first and second terminals to produce at said third terminal an output pulse at instants when pulses in said first and second trains are supplied to the corresponding first and second terminals in time coincidence, the pulses in both trains having like polarity, first and second resistors respectively coupling a corresponding one of said first and second terminals to said third terminal; and a normally conductive diode connected between said third terminal and a point of biasing potential, said diode being rendered non-conductive during said instants.

References Cited in the file of this patent

UNITED STATES PATENTS

| | | |
|---|---|---|
| 2,458,599 | Hussey | Jan. 11, 1949 |
| 2,589,465 | Weiner | Mar. 18, 1952 |
| 2,597,796 | Hindall | May 20, 1952 |
| 2,603,746 | Burkhart et al. | July 15, 1952 |
| 2,677,759 | Madey | May 4, 1954 |
| 2,730,632 | Curtis | Jan. 10, 1956 |

FOREIGN PATENTS

| | | |
|---|---|---|
| 580,575 | Great Britain | Sept. 12, 1946 |

OTHER REFERENCES

M.I.T. Radiation Laboratory Series, vol. 19, Waveforms, copyright, 1949, pp. 365, 366, "Amplitude Selectors."

Proc. of the IRE, May 1950, pages 511 to 514, "Diode Coincidence and Mixing Circuits in Digital Computers," Chen.